(12) United States Patent
Ohta et al.

(10) Patent No.: US 8,986,895 B2
(45) Date of Patent: Mar. 24, 2015

(54) GARNET-TYPE LITHIUM ION-CONDUCTING OXIDE AND ALL-SOLID-STATE LITHIUM ION SECONDARY BATTERY CONTAINING THE SAME

(75) Inventors: Shingo Ohta, Nagoya (JP); Tetsuro Kobayashi, Seto (JP); Takahiko Asaoka, Nagoya (JP); Mitsuru Asai, Aichi-gun (JP)

(73) Assignee: Kabushiki Kaisha Toyota Chuo Kenkyusho, Aichi-ken (JP)

( * ) Notice: Subject to any disclaimer, the term of this patent is extended or adjusted under 35 U.S.C. 154(b) by 964 days.

(21) Appl. No.: 13/132,795

(22) PCT Filed: Feb. 2, 2010

(86) PCT No.: PCT/JP2010/051741
§ 371 (c)(1),
(2), (4) Date: Jun. 3, 2011

(87) PCT Pub. No.: WO2010/090301
PCT Pub. Date: Aug. 12, 2010

(65) Prior Publication Data
US 2011/0244337 A1    Oct. 6, 2011

(30) Foreign Application Priority Data

Feb. 4, 2009   (JP) .................. 2009-023623
May 21, 2009   (JP) .................. 2009-122991

(51) Int. Cl.
*H01M 6/18*   (2006.01)
*H01M 10/0562*   (2010.01)
(Continued)

(52) U.S. Cl.
CPC ......... *H01M 10/0562* (2013.01); *C04B 35/481* (2013.01); *C04B 35/486* (2013.01);
(Continued)

(58) Field of Classification Search
USPC .................. 429/322, 319; 423/594.12, 593.1, 423/594.15; 521/27
See application file for complete search history.

(56) References Cited

U.S. PATENT DOCUMENTS

2004/0151986 A1   8/2004   Park et al.
2008/0241665 A1   10/2008   Sano
(Continued)

FOREIGN PATENT DOCUMENTS

DE   10 2007 030 604 A1   1/2009
EP   2 099 086 A1   9/2009
(Continued)

OTHER PUBLICATIONS

May 15, 2012 Office Action issued in Japanese Patent Application No. 2010-014341 (with translation).
(Continued)

*Primary Examiner* — Laura Weiner
(74) *Attorney, Agent, or Firm* — Oliff PLC

(57) ABSTRACT

An all-solid-state lithium ion secondary battery containing a novel garnet-type oxide serving as a solid electrolyte. The garnet-type lithium ion-conducting oxide is one represented by the formula $Li_{5+X}La_3(Zr_X, A_{2-X})O_{12}$, wherein A is at least one selected from the group consisting of Sc, Ti, V, Y, Nb, Hf, Ta, Al, Si, Ga, Ge, and Sn and X satisfies the inequality $1.4 \leq X < 2$, or is one obtained by substituting an element having an ionic radius different from that of Zr for Zr sites in an garnet-type lithium ion-conducting oxide represented by the formula $Li_7La_3Zr_2O_{12}$, wherein the normalized intensity of an X-ray diffraction (XRD) pattern with a diffraction peak, as normalized on the basis of the intensity of a diffraction peak, is 9.2 or more.

4 Claims, 12 Drawing Sheets

(51) Int. Cl.
*C04B 35/48* (2006.01)
*C04B 35/486* (2006.01)
*C04B 35/488* (2006.01)
*C04B 35/495* (2006.01)
*C04B 35/626* (2006.01)
*H01M 10/052* (2010.01)

(52) U.S. Cl.
CPC .......... *C04B35/4885* (2013.01); *C04B 35/495* (2013.01); *C04B 35/6262* (2013.01); *C04B 35/62685* (2013.01); *H01M 10/052* (2013.01); *C04B 2235/3203* (2013.01); *C04B 2235/3217* (2013.01); *C04B 2235/3224* (2013.01); *C04B 2235/3225* (2013.01); *C04B 2235/3227* (2013.01); *C04B 2235/3232* (2013.01); *C04B 2235/3239* (2013.01); *C04B 2235/3244* (2013.01); *C04B 2235/3251* (2013.01); *C04B 2235/3286* (2013.01); *C04B 2235/3287* (2013.01); *C04B 2235/3293* (2013.01); *C04B 2235/3418* (2013.01); *C04B 2235/761* (2013.01); *C04B 2235/764* (2013.01); *C04B 2235/77* (2013.01); *C04B 2235/79* (2013.01); *C04B 2235/81* (2013.01); *H01M 2300/0071* (2013.01); *Y02E 60/122* (2013.01)
USPC .................. 429/322; 423/594.12; 423/593.1; 423/594.15; 521/27

(56) References Cited

U.S. PATENT DOCUMENTS

| | | | |
|---|---|---|---|
| 2009/0081554 | A1 | 3/2009 | Takada et al. |
| 2009/0226790 | A1 | 9/2009 | Kanamura et al. |
| 2010/0047696 | A1 | 2/2010 | Yoshida et al. |
| 2010/0203383 | A1 | 8/2010 | Weppner |
| 2011/0027661 | A1 | 2/2011 | Okazaki et al. |
| 2011/0244337 | A1 | 10/2011 | Ohta et al. |
| 2014/0162113 | A1 | 6/2014 | Ohta et al. |

FOREIGN PATENT DOCUMENTS

| | | |
|---|---|---|
| EP | 2 159 867 A1 | 3/2010 |
| JP | A-06-044971 | 2/1994 |
| JP | A-11-283664 | 10/1999 |
| JP | A-2001-035495 | 2/2001 |
| JP | A-2004-235155 | 8/2004 |
| JP | A-2005-112710 | 4/2005 |
| JP | A-2007-005279 | 1/2007 |
| JP | A-2008-084798 | 4/2008 |
| JP | A-2008-226639 | 9/2008 |
| JP | A-2008-251225 | 10/2008 |
| JP | A-2009-146739 | 7/2009 |
| JP | A-2009-158476 | 7/2009 |
| JP | A-2009-193940 | 8/2009 |
| JP | A-2009-238739 | 10/2009 |
| JP | A-2010-102929 | 5/2010 |
| JP | A-2010-140725 | 6/2010 |
| JP | A-2010-192373 | 9/2010 |
| JP | A-2010-202499 | 9/2010 |
| JP | A-2010-272344 | 12/2010 |
| JP | A-2011-51800 | 3/2011 |
| JP | A-2011-129474 | 6/2011 |
| JP | A-2013-32259 | 2/2013 |
| WO | WO 2007/004590 A1 | 1/2007 |
| WO | WO 2009/003695 A2 | 1/2009 |
| WO | WO 2010/090301 A1 | 8/2010 |

OTHER PUBLICATIONS

International Preliminary Report on Patentability issued Aug. 18, 2011 in International Application No. PCT/JP2010/051741.
Murugan et al., "Fast Lithium Ion Conduction in Garnet-Type $Li_7La_3Zr_2O_{12}$," *Angew. Chem. Int. Ed.*, 2007, vol. 46, pp. 7778-7781.
International Search Report in International Application No. PCT/JP2010/051741; dated Apr. 26, 2010,.
Written Opinion of the International Searching Authority in International Application No. PCT/JP2010/051741; dated Apr. 26, 2010.
Japanese Office Action issued in Japanese Patent Application No. 2009-122991 dated Feb. 26, 2013 (w/ translation).
Awaka et al., "Synthesis and structure analysis of tetragonal $Li_7La_3Zr_2O_{12}$ with the garnet-related type structure," *Journal of Solid State Chemistry*, 182 (2009) pp. 2046-2052.
Thangadurai et al., "$Li_6ALa_2Nb_2O_{12}$(A = Ca, Sr, Ba): New Class of Fast Lithium Ion Conductors with Garnet-Like Structure," *Journal, J. Am. Ceram. Society*, 411-418 (2005), vol. 88, No. 2, pp. 411-418.
Kotobuki et al., "Compatibility of $Li_7La_3Zr_2O_{12}$ Solid Electrolyte to All-Solid-State Battery Using Li Metal Anode," *Journal of the Electrochemical Society*, Aug. 17, 2010, pp. A1076-A 1079, vol. 157, No. 10.
Sep. 11, 2012 International Search Report issued in International Application No. PCT/JP2012/065756 (with translation).
U.S. Appl. No. 14/127,825, filed Dec. 19, 2013 in the name of Ohta et al.
U.S. Appl. No. 14/464,202, filed Aug. 20, 2014 in the name of Ohta et al.

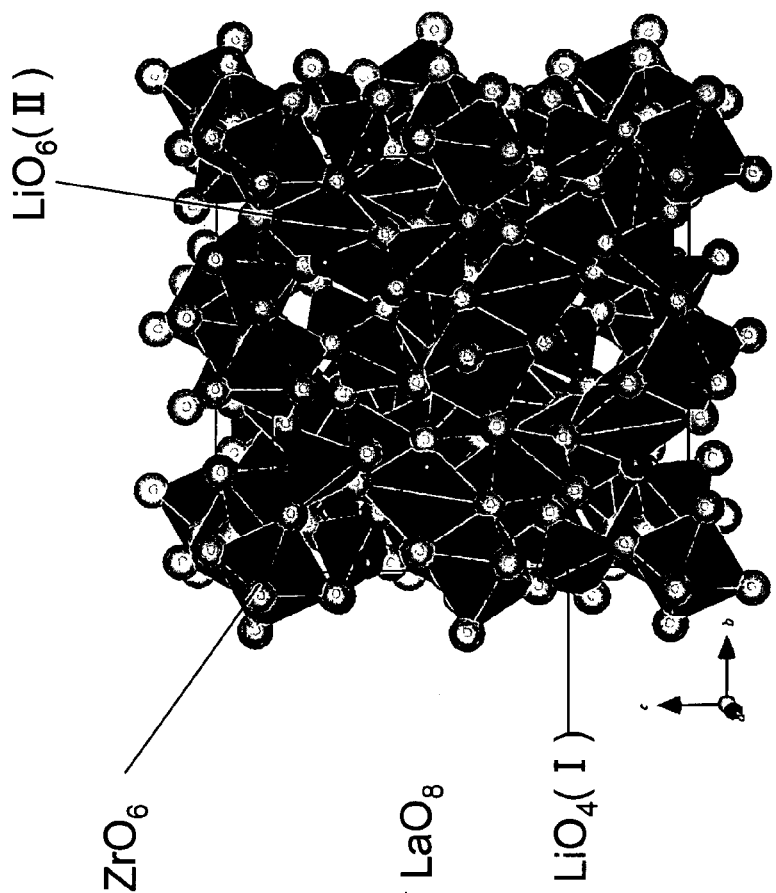
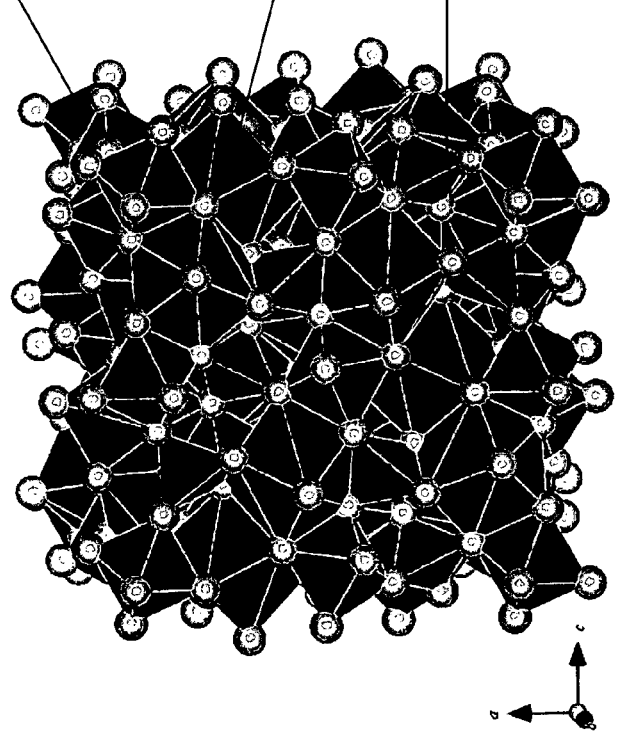
FIG. 5A
FIG. 5B

GARNET-TYPE LITHIUM ION-CONDUCTING OXIDE AND ALL-SOLID-STATE LITHIUM ION SECONDARY BATTERY CONTAINING THE SAME

TECHNICAL FIELD

The present invention relates to a garnet-type lithium ion-conducting oxide and an all-solid-state lithium ion secondary battery containing the garnet-type lithium ion-conducting oxide.

BACKGROUND ART

All-solid-state lithium ion secondary batteries contain solid electrolytes and therefore are less flammable than lithium ion secondary batteries containing nonaqueous electrolytes. Proposed examples of the all-solid-state lithium ion secondary batteries include a battery in which a lithium-lanthanum-titanium composite oxide is used as a solid electrolyte is (Patent Document 1) and a battery in which a $Li_2S$—$P_2S_3$ composition is used as a solid electrolyte (Patent Document 2). These batteries have not been in practical use. One of reasons for this is an issue relating to solid electrolytes. The solid electrolytes need to have three major properties: high lithium ion conductivity, high chemical stability, and a wide potential window. However, any solid electrolyte having such properties has not been discovered.

Garnet-type oxides have advantages such as high chemical stability and a wide potential window and therefore are candidates for solid electrolytes. However, the garnet-type oxides have disadvantages such as low conductivity. Weppner has recently reported that a garnet-type oxide, $Li_7La_3Zr_2O_{12}$, synthesized by a solid phase reaction has a conductivity of $1.9 \times 10^{-4}$ to $2.3 \times 10^{-4}$ $Scm^{-1}$ at 25° C. and an activation energy of 0.34 eV (Non-patent Document).

Patent Document 1: JP 2008-226639 A
Patent Document 2: JP 2008-084798 A
Non-patent Document: Angew. Chem. Int. Ed., 2007, 46, 7778-7781

DISCLOSURE OF THE INVENTION

There is no significant difference in conductivity between $Li_7La_3Zr_2O_{12}$ and lithium ion-conducting oxides other than garnet-type lithium ion-conducting oxides although the conductivity of $Li_7La_3Zr_2O_{12}$ is greater than that of conventional garnet-type oxides. The conductivity of a glass ceramic, $Li_{1.5}Al_{0.5}Ge_{1.5}(PO_4)_3$ (hereinafter referred to as LAGP), is about $7.0 \times 10^{-4}$ $Scm^{-1}$ and is substantially equal to that of $Li_7La_3Zr_2O_{12}$. The conductivity of a glass ceramic, $Li_{1+x}Ti_2Si_xP_{3-x}O_{12} \cdot AlPO_4$ (hereinafter referred to as an Ohara electrolyte), is about $1 \times 10^{-3}$ $Scm^{-1}$; hence, the conductivity of the Ohara electrolyte is about one order of magnitude less than that of $Li_7La_3Zr_2O_{12}$. Therefore, the development of a garnet-type oxide with higher conductivity is expected. The LAGP is reduced at 0.5 V or less (versus lithium ions) and the Ohara electrolyte is reduced at 1.5 V or less (versus lithium ions); hence, the LAGP and the Ohara electrolyte do not meet a potential window required for a solid electrolyte for secondary batteries.

The present invention has been made to solve such a problem. It is an object of the present invention to provide a garnet-type oxide having high chemical stability, a wide potential window, and high lithium ion conductivity. It is another object of the present invention to provide an all-solid-state lithium ion secondary battery containing such a garnet-type oxide.

In order to achieve the objects, the inventors have investigated the composition of a garnet-type oxide, $Li_7La_3Zr_2O_{12}$. The inventors have found that the garnet-type oxide modified by substituting an appropriate amount of Nb for Zr sites therein has a lithium ion conductivity exceeding that of $Li_7La_3Zr_2O_{12}$ and also have found that the garnet-type oxide is useful as a solid electrolyte for all-solid-state lithium ion secondary batteries. This has led to the completion of the present invention.

A first garnet-type lithium ion-conducting oxide according to the present invention has a garnet-like structure and is represented by the formula $Li_{5-x}La_3(Zr_x, A_{2-x})O_{12}$, wherein A is at least one selected from the group consisting of Sc, Ti, V, Y, Nb, Hf, Ta, Al, Si, Ga, Ge, and Sn and X satisfies the inequality $1.4 \leq X < 2$.

A second garnet-type lithium ion-conducting oxide according to the present invention is one, obtained by substituting an element having an ionic radius different from that of Zr for Zr sites in an garnet-type lithium ion-conducting oxide represented by the formula $Li_7La_3Zr_2O_{12}$, having an X-ray diffraction (XRD) pattern with a (024) diffraction peak having a normalized intensity of 9.2 or more as normalized on the basis of the intensity of a (220) diffraction peak.

The first and second garnet-type lithium ion-conducting oxides have chemical stability and potential window substantially equivalent to those of a conventional garnet-type oxide, $Li_7La_3Zr_2O_2$, and also have higher lithium ion conductivity and a smaller rate of change in lithium ion conductivity with temperature as compared with the garnet-type oxide. The reason for the above is probably as described below. It is known that a garnet-like structure contains tetracoordinated lithium ions each forming a tetrahedron together with oxygen ions located at the vertices of the tetrahedron and hexacoordinated lithium ions each forming an octahedron together with oxygen ions located at the vertices of the octahedron. In the garnet-like structure, the atomic coordinates of oxygen ions surrounding lithium ions are varied by substituting an element (for example, A described above) having an ionic radius different from that of Zr for Zr sites. Distances between the oxygen ions surrounding the lithium ions are increased by adjusting the amount of the element used; thereby allowing the lithium ions to migrate readily. This probably leads to an increase in lithium ion conductivity and a reduction in the rate of change in conductivity with temperature because of a reduction in activation energy.

An all-solid-state lithium ion secondary battery according to the present invention has a configuration in which a solid electrolyte layer is sandwiched between a positive electrode containing a positive electrode active material capable of occluding and releasing lithium ions and a negative electrode containing a negative electrode active material capable of releasing and occluding lithium ions. The solid electrolyte layer is made of the first or second garnet-type lithium ion-conducting oxide.

An all-solid-state lithium ion secondary battery according to the present invention contain a novel garnet-type oxide serving as a solid electrolyte. The novel garnet-type oxide has chemical stability and potential window substantially equivalent to those of a conventional garnet-type oxide, $Li_7La_3Zr_2O_{12}$, and also has higher lithium ion conductivity and a smaller rate of change in lithium ion conductivity with temperature as compared with the garnet-type oxide. Therefore, the all-solid-state lithium ion secondary battery containing the novel garnet-type oxide has good battery properties

BRIEF DESCRIPTION OF DRAWINGS

FIG. 5A is an illustration of the whole crystal structure of the garnet-type oxide;

FIG. 5B is an illustration showing $LiO_6$ (II) octahedrons exposed from the crystal structure;

PREFERRED EMBODIMENTS OF THE INVENTION

Figure 1:
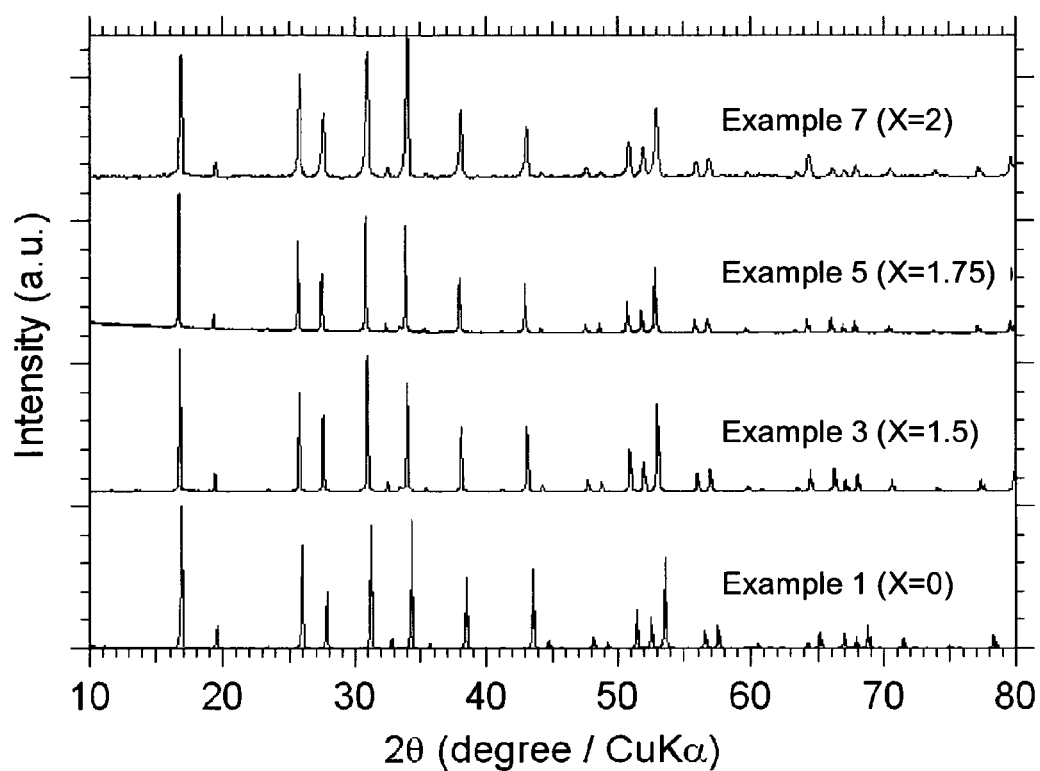
FIG. 1 is a graph showing the XRD patterns of samples of Examples 1, 3, 5, and 7.

A first garnet-type lithium ion-conducting oxide according to the present invention has a garnet-like structure and is represented by the formula $Li_{5+X}La_3(Zr_X, A_{2-X})O_{12}$, wherein A is as described above and X satisfies the inequality $1.4 \leq X < 2$. Since X satisfies the inequality $1.4 \leq X < 2$, the first garnet-type lithium ion-conducting oxide has higher lithium ion conductivity and lower activation energy as compared with a known garnet-type lithium ion-conducting oxide, $Li_7La_3Zr_2O_{22}$ (that is, X=2). When A is, for example, Nb, the first garnet-type lithium ion-conducting oxide has a lithium ion conductivity of $2.5 \times 10^{-4}$ Scm$^{-1}$ or more and an activation energy of 0.34 eV or less. Therefore, the use of the first garnet-type lithium ion-conducting oxide in an all-solid-state lithium ion secondary battery allows lithium ions to be readily conducted; hence, the all-solid-state lithium ion secondary battery has low electrolyte resistance and high output. Since the activation energy of the first garnet-type lithium ion-conducting oxide, that is, the rate of change in conductivity with temperature thereof is small, the output of the all-solid-state lithium ion secondary battery is stable. The value X preferably satisfies the inequality $1.6 \leq X \leq 1.95$ because the first garnet-type lithium ion-conducting oxide has higher lithium ion conductivity and lower activation energy. The value X more preferably satisfies the inequality $1.65 \leq X \leq 1.9$ because the first garnet-type lithium ion-conducting oxide has a substantially maximal lithium ion conductivity and a substantially minimal activation energy. A is preferably Nb or Ta, which has an ionic radius substantially equal to that of Nb.

A second garnet-type lithium ion-conducting oxide according to the present invention is one, obtained by substituting an element having an ionic radius different from that of Zr for Zr sites in an garnet-type lithium ion-conducting oxide represented by the formula $Li_7La_3Zr_2O_{12}$, having an XRD pattern with a (024) diffraction peak having a normalized intensity of 9.2 or more as normalized on the basis of the intensity of a (220) diffraction peak, the element being at least one selected from the group consisting of Sc, Ti, V, Y, Nb, Hf, Ta, Al, Si, Ga, and Ge, and Sn. Since the normalized intensity of the (024) diffraction peak is 9.2 or more, a triangle formed by oxygen ions in a $LiO_4$ (I) tetrahedron is close to an equilateral triangle and has a large area; hence, the second garnet-type lithium ion-conducting oxide has higher lithium ion conductivity and lower activation energy as compared with the known garnet-type lithium ion-conducting oxide having the formula $Li_7La_3Zr_2O_{12}$ (that is, X=2). When A is, for example, Nb, the second garnet-type lithium ion-conducting oxide has a lithium ion conductivity of $2.5 \times 10^{-4}$ Scm$^{-1}$ or more and an activation energy of 0.34 eV or less. Therefore, the use of the second garnet-type lithium ion-conducting oxide in an all-solid-state lithium ion secondary battery allows lithium ions to be readily conducted; hence, the all-solid-state lithium ion secondary battery has high output. Since the activation energy of the second garnet-type lithium ion-conducting oxide, that is, the rate of change in conductivity with temperature thereof is small, the output of the all-solid-state lithium ion secondary battery is stable. The normalized intensity of the (024) diffraction peak is preferably 10.0 or more because the second garnet-type lithium ion-conducting oxide has higher lithium ion conductivity and lower activation energy. The normalized intensity of the (024) diffraction peak is more preferably 10.2 or more because the second garnet-type lithium ion-conducting oxide has a substantially maximal lithium ion conductivity and a substantially minimal activation energy. A is preferably Nb or Ta, which has an ionic radius substantially equal to that of Nb.

An exemplary method for producing the first or second garnet-type lithium ion-conducting oxide is described below. The method includes (1) a first mixing step of mixing inorganic materials including a lithium compound, the inorganic materials being changed in state by calcination and used as raw materials; (2) a first calcining step of calcining the mixed inorganic materials at a predetermined calcining temperature to change the state of the inorganic materials; (3) a second mixing step of mixing the inorganic materials with a predetermined amount of another inorganic material; (4) a second calcining step of calcining the inorganic materials, calcined in the second mixing step, at a predetermined calcining temperature; and (5) a forming/calcining step of forming the inorganic materials calcined in the second calcining step into a compact and calcining the compact at a forming/calcining temperature. These steps are described below in detail.

(1) First Mixing Step

In this step, the inorganic materials, which are changed in state by calcination at a predetermined temperature, are mixed together. In particular, the inorganic materials are pulverized and mixed together so as to form a composition represented by the formula $Li_{5+X}La_3(Zr_X,A_{2-X})O_{12}$, wherein A is as described above and X satisfies the inequality $1.4 \leq X < 2$. Examples of the inorganic materials include carbonates, sulfonates, nitrates, oxalates, chlorides, hydroxides, and oxides of elements contained in the composition. In particular, the carbonates and hydroxides are preferred because carbon dioxide and water produced by the thermally decomposition of the carbonates and hydroxides, respectively, are relatively readily treated. For example, $Li_2CO_3$, $La(OH)_3$, $ZrO_2$, and $A_2O_3$ are preferably used, wherein A is as described above. The term "changed in state" as used herein may mean that gas is produced or a predetermined phase transition occurs. The inorganic materials, which are raw materials, are preferably mixed at a mixing ratio so as to form the target composition. The inorganic materials may be pulverized and mixed by a dry process without using any solvent or may be pulverized and mixed by a wet process. The inorganic materials are preferably pulverized and mixed in a solvent by such a wet process in view of an increase in mixing performance. For example, a planetary mill, an attritor, a ball mill, or the like can be used to mix the inorganic materials. The solvent is preferably one that hardly dissolves Li and is more preferably an organic solvent such as ethanol. The mixing time of the inorganic materials depends on the amount thereof and may be, for example, two to eight hours.

(2) First Calcining Step

In this step, the inorganic materials mixed in the first mixing step are calcined at a predetermined calcining temperature (hereinafter referred to as a first temperature) that is higher than or equal to a predetermined temperature at which the inorganic materials are changed in state and is lower than the forming/calcining temperature. The predetermined calcining temperature is higher than or equal to a temperature at which $Li_2CO_3$ is decomposed when the inorganic materials include this carbonate. This can suppress a reduction in density due to the production of gas by thermal decomposition in the forming/calcining step. The first temperature is preferably 900° C. to 1,150° C. The calcining temperature of the inorganic materials can be empirically determined within a range where the inorganic materials are sufficiently changed in state and the evaporation of a readily volatile component (hereinafter also referred to as a volatile component) such as lithium can be prevented.

(3) Second Mixing Step

In this step, the inorganic material is added to the inorganic materials (hereinafter also referred to as first materials) calcined in the first calcining step and these inorganic materials are mixed together, the amount of the added inorganic material being determined depending on conditions for calcining the inorganic materials. A principal object of this step is to correct changes in composition due to evaporation in each calcining step. An example of the added inorganic material is an inorganic compound, such as $Li_2CO_3$, containing the volatile component or the like. The amount of the added inorganic material can be empirically determined depending on conditions of the first and second calcining steps and the forming/calcining step. The amount of the added inorganic material may be determined depending changes in composition. The type of the added inorganic material, a process for mixing the added inorganic material with the inorganic materials, and the mixing time of the added inorganic material and the inorganic materials may be as described in the first mixing step. In the second mixing step, the type of the added inorganic material, the process for mixing the added inorganic material with the inorganic materials, and the mixing time of the added inorganic material and the inorganic materials may be the same as or different from those described in the first mixing step. In the second mixing step, Li is preferably added to the inorganic materials such that the amount of Li added thereto is 4 to 20 atomic percent of the amount of Li in the inorganic materials.

(4) Second Calcining Step

In this step, the inorganic materials (the first materials) mixed with the added inorganic material are calcined at a calcining temperature (hereinafter referred to as a second temperature) that is higher than or equal to a predetermined temperature at which the inorganic materials are changed in state and is lower than the forming/calcining temperature. A principal object of this step is to change the state of the added inorganic material. The second calcining step may be performed under substantially the same conditions as those of the first calcining step. The second calcining step is preferably performed at a temperature that is higher than or equal to the predetermined temperature at which the inorganic materials are changed in state and is lower than equal to the calcining temperature of the first calcining step. This prevents the calcined inorganic materials from being solidified; hence, the inorganic materials calcined in the forming/calcining step need not be pulverized. Since the amount of the inorganic material changed in state in the second calcining step is far less than that in the first calcining step, the calcining temperature in the second calcining step may be short. Since the second calcining step is performed, a reduction in density due to the change in state of the inorganic material added to suppress changes in composition can be suppressed in the forming/calcining step.

(5) Forming/Calcining Step

In this step, the inorganic materials (hereinafter also referred to as second materials) calcined in the second calcining step are formed into the compact and the compact is calcined at the forming/calcining temperature, which is higher than the calcining temperature. In the forming/calcining step, it is preferred that the second materials be not pulverized in a solvent in advance of the formation of the compact. This can prevent the volatile component, which is evaporated in the forming/calcining step and is excessively contained in the second materials, from being changed in state due to the contact of the volatile component with such a solvent; hence, a reduction in density due to the change in state of the inorganic materials can be securely suppressed. When the inorganic materials include, for example, $Li_2CO_3$, $Li_2O$ produced from an excessive amount of $Li_2CO_3$ in the second calcining step can be prevented from being converted into LiOH or $Li_2CO_3$. In the case of mixing the inorganic materials in a solvent in the first or second mixing step, it is preferred that the inorganic materials be not mixed in any solvent in advance of the forming/calcining step. Since the second materials are calcined twice subsequently to the second calcining step and therefore are hardly solidified or fixed, the second materials can be relatively readily formed into the compact by simple breaking. The compact can be formed so as to have an arbitrary shape by subjecting the second materials to, for example, cold isotropic pressing (CIP), hot isotropic pressing (HIP), molding, hot pressing, or the like.

According to the method, an empirically determined amount of the inorganic material is added to the inorganic materials calcined in the first calcining step, the inorganic materials and the added inorganic material are re-calcined and then formed into the compact, and the compact is calcined. Therefore, a change in volume due to the change in state of the inorganic materials can be reduced and changes in composition can be accurately suppressed. A method for producing the first or second garnet-type lithium ion-conducting oxide according to the present invention is not limited to this one and the first or second garnet-type lithium ion-conducting oxide may be produced by another method.

An all-solid-state lithium ion secondary battery according to the present invention has a configuration in which a solid electrolyte layer is sandwiched between a positive electrode containing a positive electrode active material capable of occluding and releasing lithium ions and a negative electrode containing a negative electrode active material capable of releasing and occluding lithium ions. The solid electrolyte layer is made of the first or second garnet-type lithium ion-conducting oxide.

In the all-solid-state lithium ion secondary battery, a polymer electrolyte layer may be disposed between the solid electrolyte layer and the positive or negative electrode. This allows the adhesion between the solid electrolyte layer and the positive or negative electrode to be enhanced; hence, good battery properties are achieved.

In the all-solid-state lithium ion secondary battery, the positive electrode active material, which is contained in the positive electrode, may be a sulfide containing a transition metal element or an oxide containing lithium and a transition metal element. Examples of the positive electrode active material include transition metal sulfides such as $TiS_2$, $TiS_3$, $MoS_3$, and $FeS_2$; lithium-manganese composite oxides such as $LiMnO_2$ and $LiMn_2O_4$; lithium-cobalt composite oxides such as $LiCoO_2$; lithium-nickel composite oxides such as $LiNiO_2$; lithium-manganese-cobalt composite oxides such as $LiMnCoO_4$; lithium-iron composite oxides such as $LiFeO_2$; lithium-iron-phosphorus composite oxides such as $LiFePO_4$; lithium-vanadium composite oxides such as $LiV_2O_4$; and transition metal oxides such as $V_2O_5$.

In the all-solid-state lithium ion secondary battery, examples of the negative electrode active material, which is contained in the negative electrode, include metallic lithium, carbonaceous materials capable of releasing and occluding lithium ions, lithium-containing alloys such as Li—Al and Li—Zn, indium-containing alloys such as In—Sb and Cu—In—Sn, oxides such as $Li_4Ti_5O_{12}$ and $WO_2$, lanthanum-nickel compounds such as $La_3Ni_2Sn_7$, and conductive polymers. The carbonaceous materials are preferred in view of safety. The carbonaceous materials are not particularly limited. Examples of the carbonaceous materials include cokes, glassy carbons, graphites, non-graphitizable carbons, pyrolytic carbons, and carbon fibers. In particular, the negative electrode active material is preferably graphite such as synthetic or natural graphite because such graphite has an operating potential close to that of metallic lithium, charge and discharge can be performed at a high operating voltage, self-discharge can be suppressed in the case of using a lithium salt as an electrolyte salt, and irreversible capacity can be reduced during charge.

In the all-solid-state lithium ion secondary battery, a process for preparing the positive or negative electrode is not particularly limited and a vapor or solid phase process can be used to prepare the positive or negative electrode. Examples of the vapor phase process include pulse laser deposition (PLD), sputtering, vapor deposition, and chemical vapor deposition (CVD) including metal-organic Chemical vapor deposition (MOCVD). Examples of the solid phase process include a sintering process, a sol-gel process, a doctor blade process, a screen printing process, a slurry casting process, and powder pressing. The following solvent can be used to prepare slurry by a doctor blade process or a similar process: an aromatic hydrocarbon solvent such as toluene or xylene or an alcoholic solvent such as ethanol or propanol. When the slurry contains a resin binder, the resin binder may be, for example, a polyvinyl resin. In the case of manufacturing the all-solid-state lithium ion secondary battery by powder pressing, all of the positive electrode active material, the negative electrode active material, and the solid electrolyte may be powdery. Alternatively, the solid electrolyte may be solid and the positive and negative electrode active materials may be powdery. Alternatively, the solid electrolyte may be powdery and the positive and negative electrode active materials may be solid.

The all-solid-state lithium ion secondary battery is not particularly limited in shape and may have a coin shape, a button shape, a sheet shape, a multilayer shape, a cylindrical shape, a flat shape, a rectangular shape, or another shape. Those identical to the all-solid-state lithium ion secondary battery may be connected to each other in series so as to form a power supply for electric vehicles. Examples of the electric vehicles include battery electric vehicles powered by batteries only, hybrid electric vehicles powered by internal combustion engines and motors, and fuel-cell electric vehicles powered by fuel cells.

Figure 17:
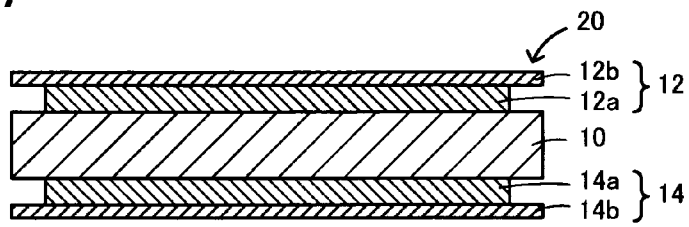
FIG. 17 is an illustration showing an example of the structure of the all-solid-state lithium ion secondary battery.
Figure 18:
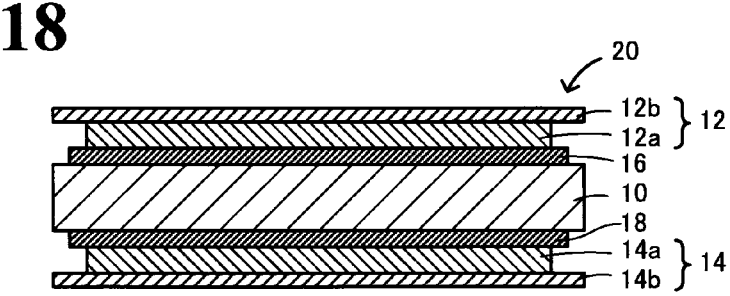
FIG. 18 is an illustration showing an example of the structure of the all-solid-state lithium ion secondary battery.
Figure 19:
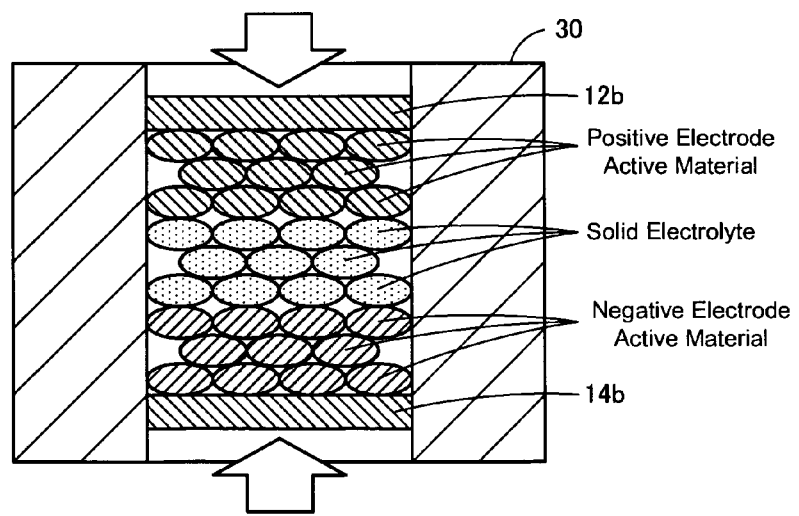
FIG. 19 is an illustration showing an exemplary technique for preparing the all-solid-state lithium ion secondary battery.

The all-solid-state lithium ion secondary battery is not particularly limited in shape and may have a structure shown in FIG. 17 or 18. The all-solid-state lithium ion secondary battery 20 includes the solid electrolyte layer 10, which is made of the first or second garnet-type oxide, the positive electrode 12, which is disposed on a surface of the solid electrolyte layer 10, and the negative electrode 14, which is disposed on another surface of the solid electrolyte layer 10, as shown in FIG. 17. The positive electrode 12 includes a positive electrode active material layer 12a containing the positive electrode active material and a positive electrode current collector 12b in contact with the positive electrode active material layer 12a. The negative electrode 14 includes a negative electrode active material layer 14a containing the negative electrode active material and a negative electrode current collector 14b in contact with the negative electrode active material layer 14a. The all-solid-state lithium ion secondary battery 20 may be manufactured by a vapor phase process, a solid phase process, or a combination of a vapor phase process and a solid phase process. The solid electrolyte layer 10 is formed so as to have a block shape. The positive electrode 12 and the negative electrode 14 are formed on surfaces of the solid electrolyte layer 10 by a vapor phase process, a solid phase process, or a combination of a vapor phase process and a solid phase process. Alternatively, the following members may be deposited on the negative electrode current collector 14b in this order by a vapor phase process, a solid phase process, or a combination of a vapor phase process and a solid phase process: the negative electrode active material layer 14a, the solid electrolyte layer 10, the positive electrode active material layer 12a, and the positive electrode current collector 12b. Alternatively, as shown in FIG. 19, the negative electrode current collector 14b is provided in a cylindrical insulating vessel 30; a powder of the negative electrode active material, a powder of the solid electrolyte, and a powder of the positive electrode active material are provided on the negative electrode current collector 14b in that order; the positive electrode current collector 12b is provided on the negative electrode active material powder; and the positive and negative electrode current collectors 12b and 14b may be pressed so as to approach each other. The all-solid-state lithium ion secondary battery 20 may further include a first polymer electrolyte layer 16 and a second polymer electrolyte layer 18 in addition to the solid electrolyte layer 10, the positive electrode 12, and the negative electrode 14 as shown in FIG. 18, the first polymer electrolyte layer 16 being disposed above a surface of the solid electrolyte layer 10 with the positive electrode 12 disposed therebetween, the second polymer electrolyte layer 18 being disposed above a surface of the solid electrolyte layer 10 with the negative electrode 14 disposed therebetween. The positive electrode 12 includes the positive electrode active material layer 12a and the positive electrode current collector 12b as described above. The negative electrode 14 includes the negative electrode active material layer 14a and the negative electrode current collector 14b as described above. The all-solid-state lithium ion secondary battery 20 may be manufactured in such a manner that the positive electrode active material layer 12a is deposited on a surface of the positive electrode current collector 12b, the negative electrode active material layer 14a is deposited on a surface of the negative electrode current collector 14b, a gelled polymer electrolyte is applied to the positive electrode active material layer 12a and the negative electrode active material layer 14a, and the solid electrolyte layer 10 is sandwiched between the positive electrode active material layer 12a and the negative electrode active material layer 14a. The all-solid-state lithium ion secondary battery 20 may include both or one of the first and second polymer electrolyte layers 16 and 18.

EXAMPLES

Preparation of Garnet-type Oxides

Garnet-type oxides, $Li_{5+x}La_3(Zr_x, Nb_{2-x})O_{12}$ (X=0-2), were synthesized from the following starting materials: $Li_2CO_3$, $La(OH)_3$, $ZrO_2$, and $Nb_2O_5$. In Examples 1 to 7, X was equal to 0, 1.0, 1.5, 1.625, 1.75, 1.875, or 2.0 (see Table 1). The starting materials were weighed so as to yield a stoichiometric ratio. The weighed starting materials were pulverized and mixed in ethanol in a planetary ball mill containing zirconium balls at 300 rpm for one hour (a first mixing step). A powder of the mixed starting materials was separated from the zirconium balls and ethanol and then calcined in an $Al_2O_3$ crucible at 950° C. for ten hours under an air atmosphere (a first calcining step). In order to compensate for the loss of Li during sintering, $Li_2CO_3$ was excessively added to the calcined powder such that the amount of added $Li_2CO_3$ was ten atomic percent of the amount of Li in the composition represented by the formula $Li_{5+x}La_3(Zr_x, Nb_{2-x})O_{12}$ (X=0-2). The calcined powder and $Li_2CO_3$ were mixed in ethanol in a planetary ball mill containing zirconium balls at 300 rpm for one hour (a second mixing step). The obtained mixture was calcined at 950° C. for ten hours in an air atmosphere (a second calcining step). The resulting mixture was formed into a compact, which was then calcined at 1200° C. for 36 hours in an air atmosphere (a forming/firing step). Samples were prepared by this procedure in Examples 1 to 7. Examples 3 to 6 correspond to examples of the present invention and Examples 1, 2, and 7 correspond to comparative examples.

TABLE 1

| Example 1 | X = 0     | $Li_5La_3Nb_2O_{12}$                          |
| Example 2 | X = 1.0   | $Li_6La_3(Zr_1, Nb_1)O_{12}$                  |
| Example 3 | X = 1.5   | $Li_{6.5}La_3(Zr_{1.5}, Nb_{0.5})O_{12}$      |
| Example 4 | X = 1.625 | $Li_{6.625}La_3(Zr_{1.625}, Nb_{0.375})O_{12}$|
| Example 5 | X = 1.75  | $Li_{6.75}La_3(Zr_{1.75}, Nb_{0.25})O_{12}$   |
| Example 6 | X = 1.875 | $Li_{6.875}La_3(Zr_{1.875}, Nb_{0.125})O_{12}$|
| Example 7 | X = 2.0   | $Li_7La_3Zr_2O_{12}$                          |

[Measurement of Properties of Garnet-type Oxides and Measurement Results]

1. Relative Density

The measurement density of each sample was calculated in such a manner that the sample was dried, measured for weight with an electronic balance, and measured for size with a vernier caliper and the weight of the sample was divided by the volume thereof. The relative density, in percent, of the sample was determined in such a manner that the theoretical density of the sample was calculated, the measurement density of the sample was divided by the theoretical density thereof, and the quotient was multiplied by 100. In Examples 1 to 7, the samples had had a relative density of 88% to 92%.

2. Phase and Lattice Parameters

Figure 2:
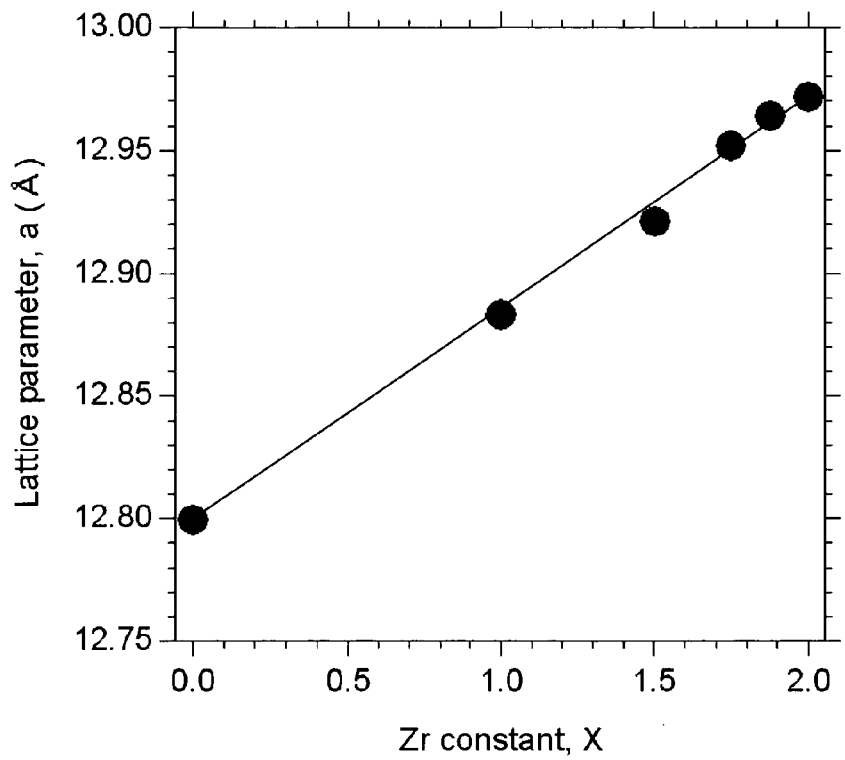
FIG. 2 is a graph showing the X-value dependence of lattice parameters of samples of Examples 1 to 3 and 5 to 7.

The phase and lattice parameters of each sample were determined from the XRD measurements thereof. The XRD of a powder of the sample was measured with an X-ray diffractometer, D8 Advance, available from Broker under the following conditions: $CUK\alpha$, 2θ=10° to 120°, and 0.01° step/sec. Obtained data was subjected to crystal structure analysis with a crystal structure analysis program, Rietan-2000 (Mater. Sci. Forum, (2000), pp. 321-324, 198). FIG. 1 shows the XRD patterns of the samples of Examples 1, 3, 5, and 7, that is, $Li_{5+x}La_3(Zr_x, Nb_{2-x})O_{12}$ (X=0, 1.5, 1.75, or 2). As is clear from FIG. 1, these samples contain no impurities and have a single phase. FIG. 2 shows the X-value dependence of a lattice parameter determined from the XRD pattern of each of the samples of Examples 1 to 3 and 5 to 7. As is clear from FIG. 2, an increase in the percentage of Zr increases the lattice parameter. This is because the radius ($r_{Zr4+}$=0.79 Å) of a $Zr^{4+}$ ion is larger than the radius ($r_{Nb5+}$=0.69 Å) of an $Nb^{5+}$ ion. Since the lattice parameter varies continuously, Nb is considered to be substituted for a Zr site (a complete solid solution is considered to be available).

3. Conductivity

Figure 3:
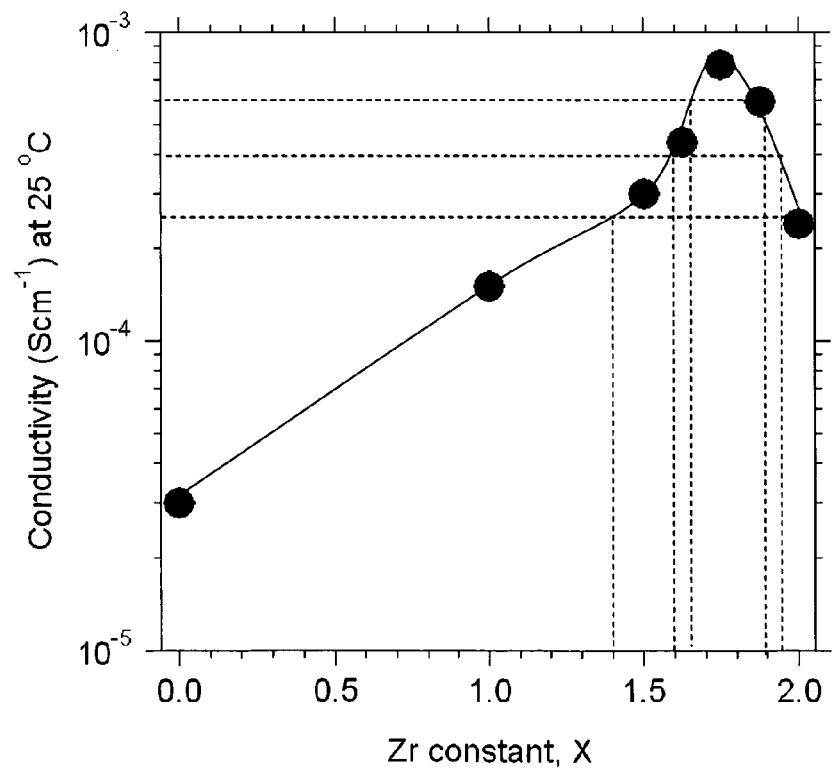
FIG. 3 is a graph showing the X-value dependence of the conductivity of samples of Examples 1 to 7.

The resistance of each sample was determined from a circular arc of a Nyquist plot obtained with an AC impedance analyzer in a constant-temperature bath at a frequency of 0.1 Hz to 1 MHz and an amplitude voltage of 100 mV. The conductivity of the sample was calculated from the resistance thereof. A blocking electrode used to measure the resistance of the sample with the AC impedance analyzer was an Au electrode. The Au electrode was formed in such a manner that an Au paste was applied to the sample and then baked at 850° C. for 30 minute. FIG. 3 shows the X-value dependence of the conductivity of the samples of Examples 1 to 7, that is, $Li_{5+x}La_3(Zr_x, Nb_{2-x})O_{12}$ (X=0-2) at 25° C. As is clear from FIG. 3, the conductivity is greater than that of known $Li_7La_3Zr_2O_{12}$ (that is, X=2, Example 7), is far greater than that of the sample of Example 7, and is substantially maximal ($6\times10^{-4}$ $Scm^{-1}$) when X satisfies the inequality 1.4≤X<2, the inequality 1.6≤X≤1.95, and the inequality 1.65≤X≤1.9, respectively. Since the samples have a relative density of 88% to 92% as described above in Item 1, the reason why the conductivity varies depending on X is considered to be not due to the influence of density.

The reason why the conductivity is increased by the addition of an appropriate amount of niobium is described below.

Figure 4:
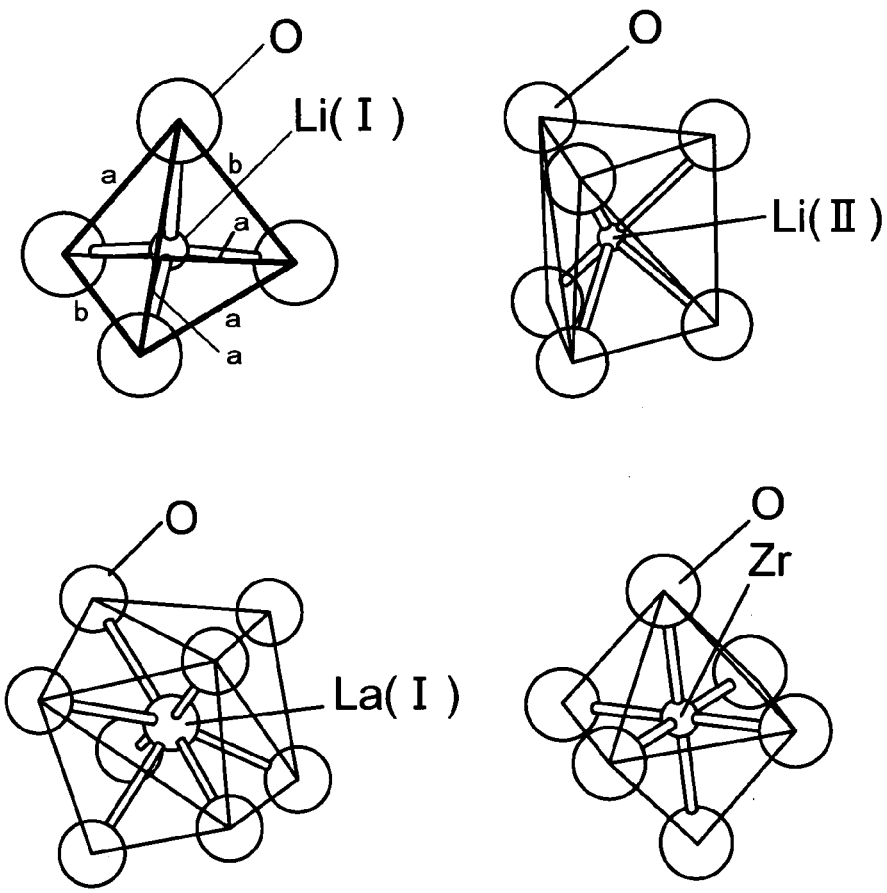
FIG. 4 is an illustration of portions of the crystal structure of a garnet-type oxide.
Figure 6A:
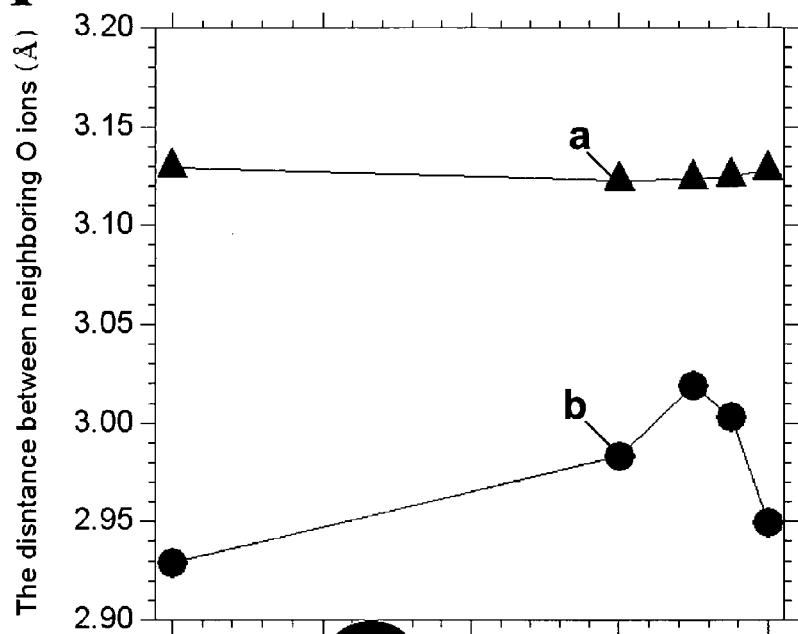
FIG. 6A is a graph showing the X-value dependence of sides a and b of a triangle formed by oxygen ions in each of $LiO_4$ (I) tetrahedrons of samples of Examples 1, 3, and 5 to 7.
Figure 6B:
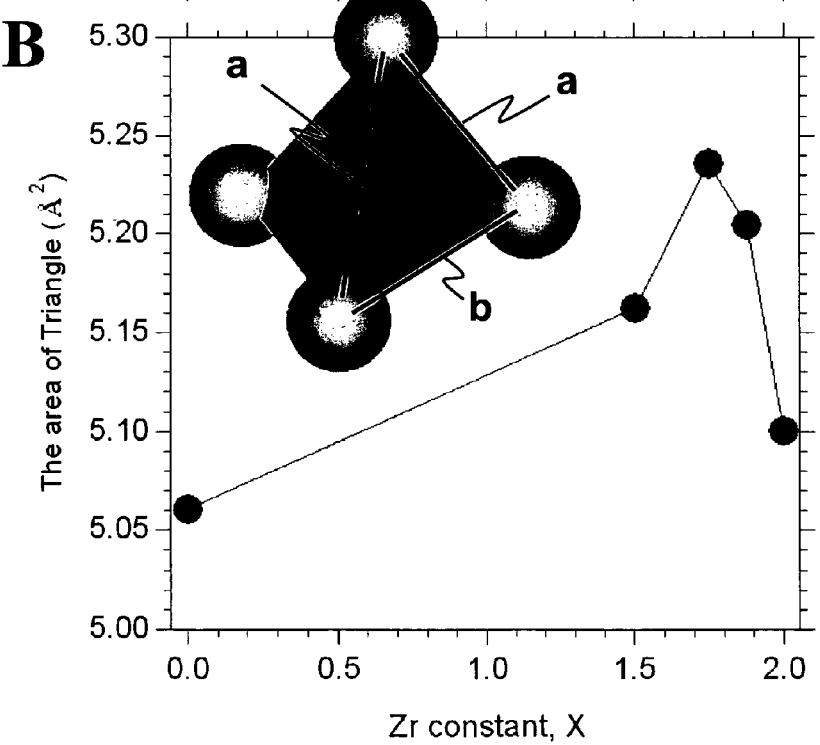
FIG. 6B is a graph showing the X-value dependence of the area of the triangle.

The crystal structure of a garnet-type oxide includes $LiO_4$ (I) tetrahedrons each consisting of a lithium ion and four oxygen ions coordinated thereto, $LiO_6$ (II) octahedrons each consisting of a lithium ion and six oxygen ions coordinated thereto, $LaO_8$ dodecahedrons each consisting of a lanthanum ion and eight oxygen ions coordinated thereto, and $ZrO_6$ octahedrons each consisting of a zirconium ion and six oxygen ions coordinated thereto as shown in FIG. 4. FIG. 5A shows the whole crystal structure thereof. In the crystal structure shown in FIG. 5A, each $LiO_6$ (II) octahedron is surrounded by the $ZrO_6$ octahedrons and the $LaO_8$ dodecahedrons and therefore cannot be seen. FIG. 5B shows the $LiO_6$ (II) octahedrons exposed by removing the $LaO_8$ dodecahedrons from the crystal structure shown in FIG. 5A. Hexacoordinated lithium ions are each surrounded by six oxygen ions, three lanthanum ions, and two zirconium ions and are not probably involved in conductivity. Tetracoordinated lithium ions each form a tetrahedron together with oxygen ions located at the vertices of the tetrahedron. FIG. 6 shows the structural change of a $LiO_4$ (I) tetrahedron determined by Rietveld profile analysis. The number of distances between oxygen ions forming the $LiO_4$ (I) tetrahedron is two. In the $LiO_4$ (I) tetrahedron, two long sides are represented by a and a short side is represented by b. As shown in FIG. 6A, the length of the long sides a is substantially constant independently of the substitution amount of Nb and the length of the short side b is increased by substituting an appropriate amount of Nb. That is, the substitution of an appropriate amount of Nb allows a triangle formed by oxygen ions to be close to an equilateral triangle and to be increased in area (see FIG. 6B). This suggests that the substitution of an appropriate amount of Nb for Zr optimizes structures (triangles formed by oxygen ions) around conducting lithium ions and allows the lithium ions to migrate readily. An element substituted for Zr may be, for example, Sc, Ti, V, Y, Hf, Ta, or the like in addition to Nb because a similar structural change can be expected and therefore a similar advantage can be achieved.

Figure 7:
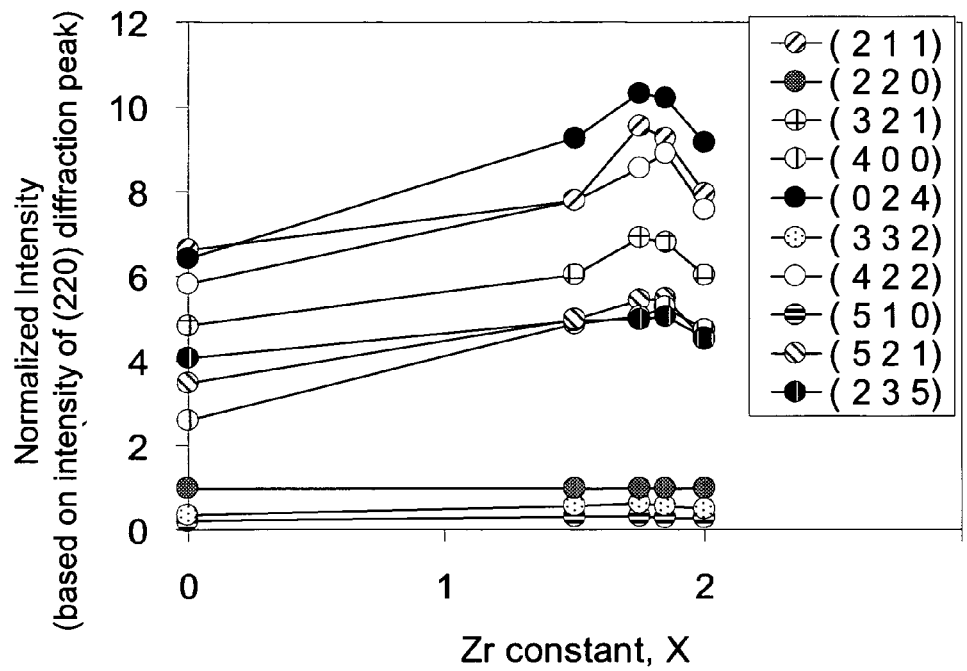
FIG. 7 is a graph showing the X-value dependence of the normalized intensity of each of diffraction peaks of samples of Examples 1 to 3, 5, and 7, the normalized intensity being determined by normalizing the intensity of each diffraction peak on the basis of the intensity of the (220) diffraction peak of a corresponding one of the samples.
Figure 8:
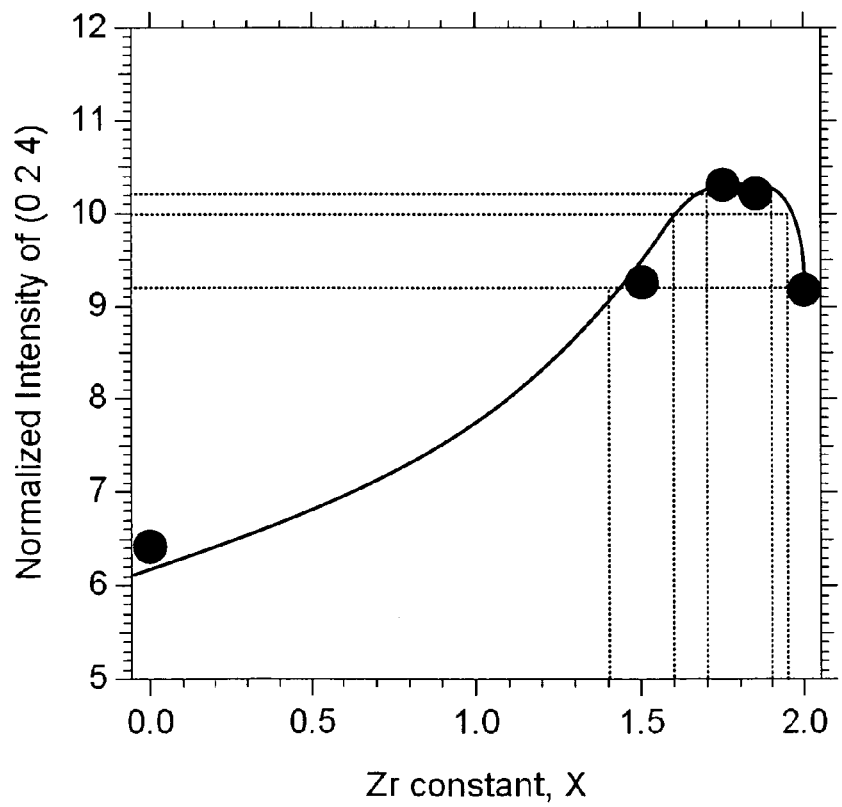
FIG. 8 is a graph showing the X-value dependence of the normalized intensity of each of diffraction peaks of samples of Examples 1, 3, and 5 to 7, the normalized intensity being determined by normalizing the intensity of each diffraction peak on the basis of the intensity of the (024) diffraction peak of a corresponding one of the samples.

The intensity of XRD peaks varies depending on the structure or a $LiO_4$ (I) tetrahedron. Triangles forming the $LiO_4$ (I) tetrahedron are varied by substituting Nb for Zr sites as described above and therefore the intensity ratio of the XRD peaks varies. FIG. 7 shows the X-value dependence of the normalized intensity of each of diffraction peaks of the samples of Examples 1 to 3, 5, and 7, the normalized intensity being determined by normalizing the intensity of each diffraction peak on the basis of the intensity of the (220) diffraction peak of a corresponding one of the samples. The normalized intensity of the (024) diffraction peak, which is typical, of each sample is noted (see FIG. 8). The normalized intensity of the (024) diffraction peak is 9.2 or more when the inequality 1.4 X<2 holds and therefore the conductivity is greater than that of known $Li_7La_3Zr_2O_{12}$ (that is, X=2, Example 7). The normalized intensity of the (024) diffraction peak is 10.0 or more when the inequality $1.6 \leq X \leq 1.95$ holds and therefore the conductivity is far greater. The normalized intensity of the (024) diffraction peak is 10.2 or more when the inequality $1.65 \leq X \leq 1.9$ holds and therefore the conductivity is substantially maximal.

4. Activation Energy (Ea)

Figure 9:
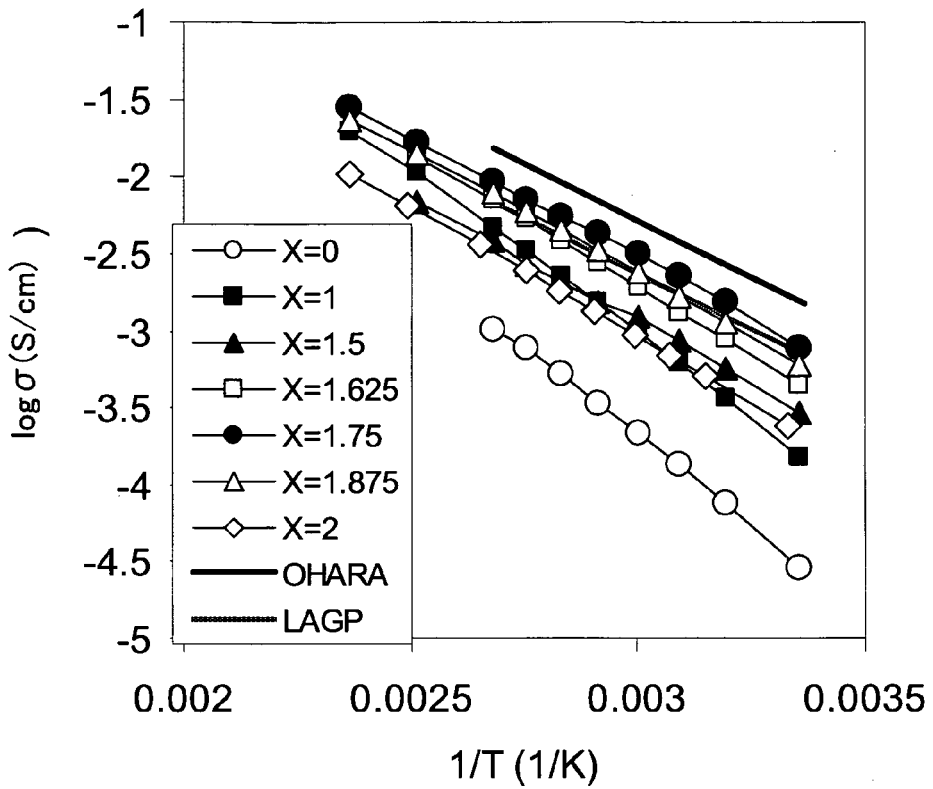
FIG. 9 is a graph showing the Arrhenius plots of samples of Examples 1 to 7.
Figure 10:
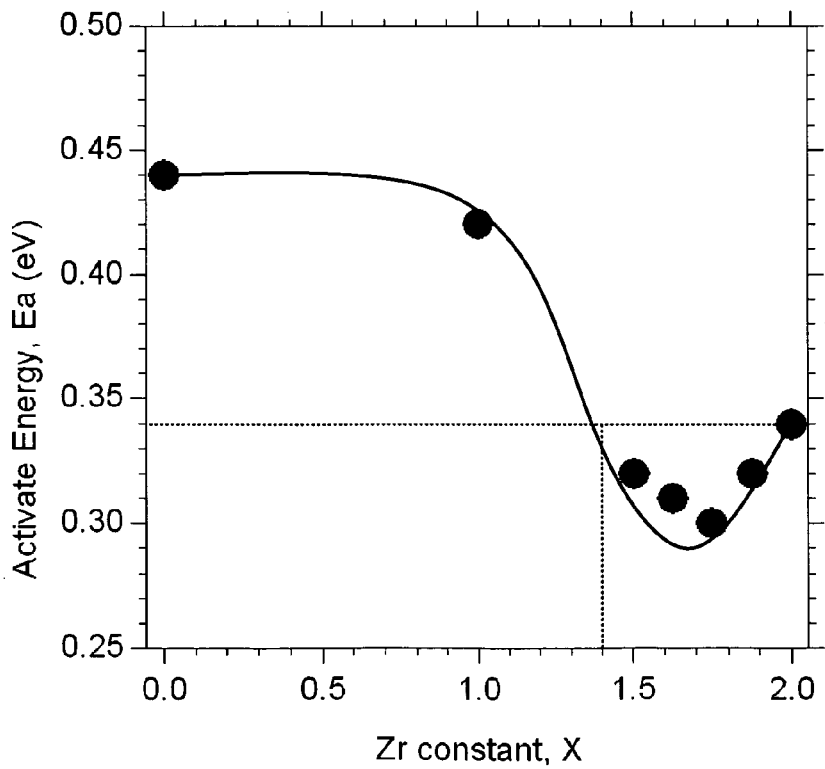
FIG. 10 is a graph showing the X-value dependence of the activation energy of each of samples of Examples 1 to 7.

The activation energy (Ea) of each sample was determined from the slope of an Arrhenius plot using the Arrhenius equation $\sigma = A \exp(-Ea/kT)$, wherein $\sigma$ is the conductivity, A is the frequency factor, k is the Boltzmann constant, T is absolute temperature, and Ea is the activation energy. FIG. 9 shows the temperature dependence (Arrhenius plot) of the conductivity of each of the samples of Examples 1 to 7. FIG. 9 also shows the temperature dependence (literature data) of the conductivity of the glass ceramic $Li_{1+X}Ti_2Si_XP_{3-X}O_{12} \cdot AlPO_4$ (the Ohara electrolyte, X=0.4) and that of the glass ceramic $Li_{1.5}Al_{0.5}Ge_{1.5}(PO_4)_3$ (LAGP), these glass ceramics being lithium ion-conducting oxides having particularly high conductivity. FIG. 10 shows the X-value dependence of the activation energy Ea of each of the samples of Examples 1 to 7, the activation energy being determined from the Arrhenius plot. As is clear from FIG. 10, the samples in which X satisfies the inequality $1.4 \leq X < 2$ have an activation energy less than that of $Li_7La_3Zr_2O_{12}$ (X=2, Example 7), that is, an activation energy Ea of less than 0.34 eV. Therefore, these samples have stable conductivity over a wide temperature range. The samples in which X satisfies the inequality $1.5 \leq X \leq 1.9$ have an activation energy of 0.32 eV or less. The sample in which X is 1.75 has an activation energy of 0.3 eV, which is minimal. An activation energy of 0.3 eV is substantially equal to the lowest among those of existent lithium ion-conducting oxides (the Ohara electrolyte has an activation energy of 0.3 eV and LAGP has an activation energy of 0.31 eV).

5. Chemical Stability

Figure 11:
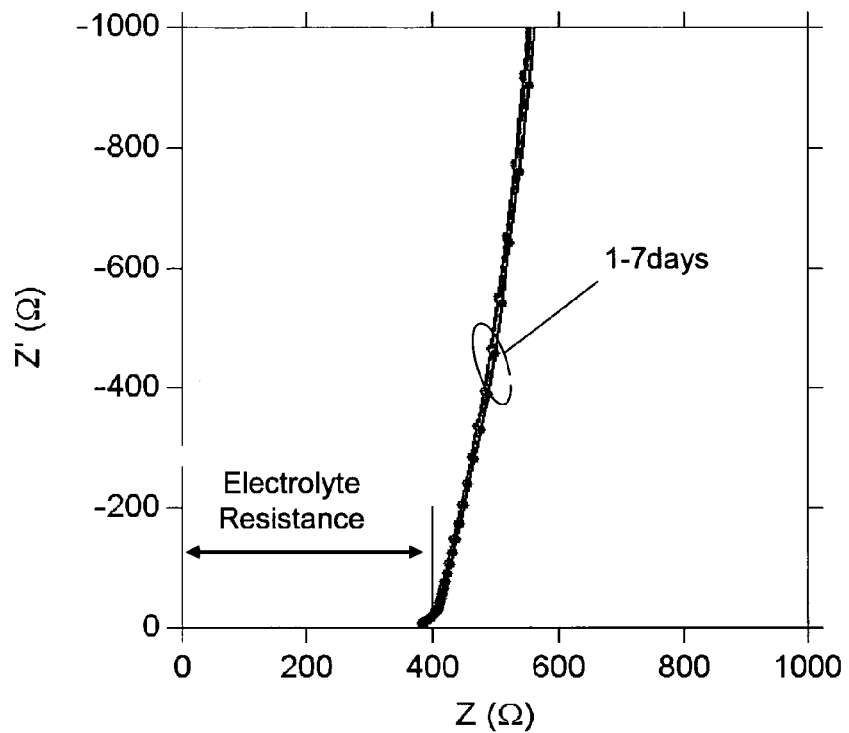
FIG. 11 is a graph showing the chemical stability of a sample of Example 5, the sample being tested at room temperature in air.

A garnet-type oxide, $Li_{6.75}La_3Zr_{1.75}Nb_{0.25}O_{12}$ (that is, X=1.75, Example 5), was investigated for chemical stability at room temperature in air. In particular, the change in conductivity of $Li_{6.75}La_3Zr_{1.75}Nb_{0.25}O_{12}$ with time was measured in such a manner that $Li_{6.75}La_3Zr_{1.75}Nb_{0.25}O_{12}$ was left in air for seven days. FIG. 11 shows the measurement results. A bulk resistance component is constant independently of the exposure time of the garnet-type oxide in air. This shows that the garnet-type oxide is stable at room temperature in air.

6. Potential Window

Figure 12:
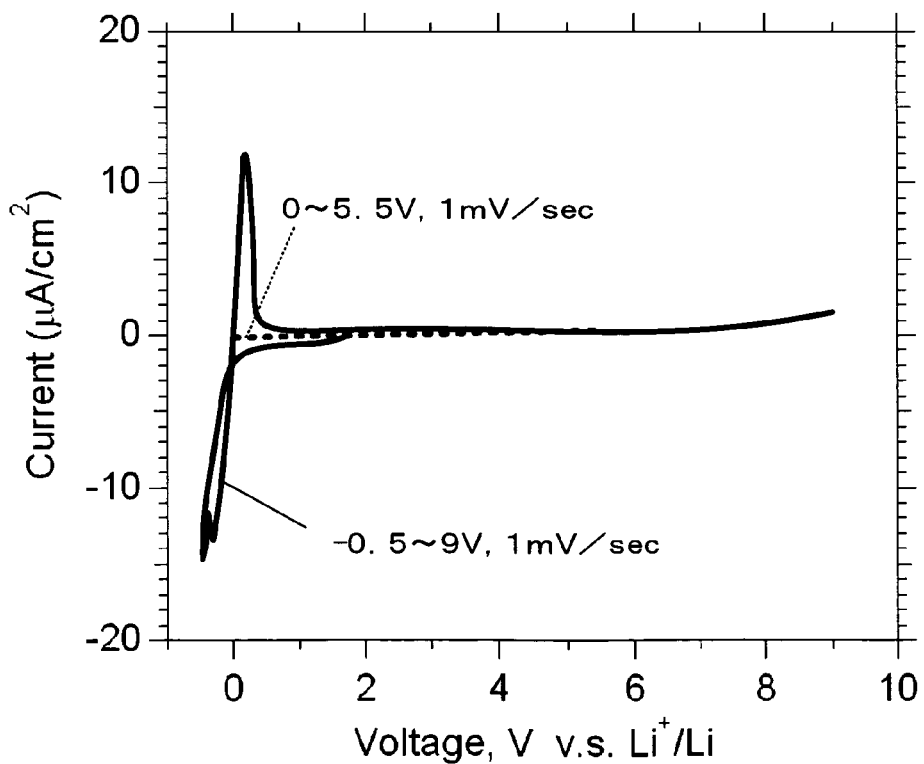
FIG. 12 is a graph showing results obtained by measuring the potential window of the sample of Example 5.

The garnet-type oxide $Li_{6.75}La_3Zr_{1.75}Nb_{0.25}O_{12}$ (that is, X=1.75, Example 5) was investigated for potential window. The potential window thereof was measured in such a manner that gold was applied to a surface of a bulk pellet of $Li_{6.75}La_3Zr_{1.75}Nb_{0.25}O_2$, a Li metal was applied to another surface thereof, and the potential of the bulk pellet was swept at 1 mV/s within a range from 0 to 5.5 V or within a range from −0.5 to 9.5 V (versus $Li^+$ ions). FIG. 12 shows the measurement results. The increase of a scanning potential from −0.5 to 9.5 V allows a redox current to flow at above or below 0 V. This is probably due to the oxidation or reduction of lithium. A slight oxidation current flows at about 7 V or more. The flowing oxidation current is very small and no change in color is visually observed. Therefore, the flowing oxidation current is not due to the decomposition of an electrolyte but is probably due to traces of impurities contained in ceramics or the decomposition of grain boundaries.

[Preparation of all-Solid-State Lithium Ion Secondary Battery]

Figure 13A:
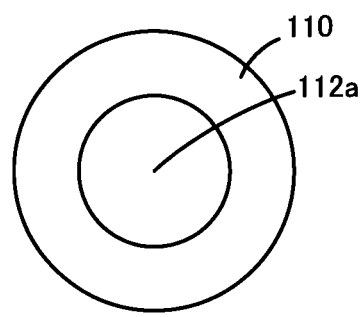
FIG. 13A is a front view of a pellet having a positive electrode active material layer.
Figure 13B:
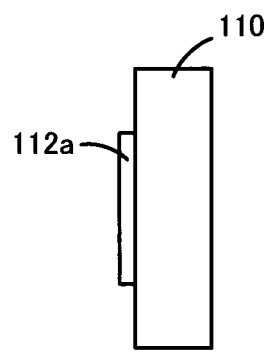
FIG. 13B is a right side view of the pellet.
Figure 14:
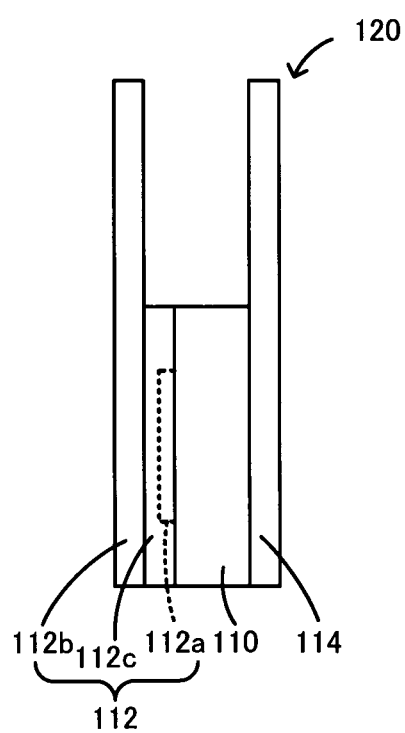
FIG. 14 is a sectional view of an all-solid-state lithium ion secondary battery.

An all-solid-state lithium ion secondary battery 120 was prepared using the garnet-type oxide $Li_{6.75}La_3Zr_{1.75}Nb_{0.25}O_{12}$ (that is, X=1.75, Example 5) as a solid electrolyte. FIG. 13 is an illustration of a pellet 110, made of the garnet-type oxide, including a positive electrode active material layer 112a. FIG. 14 is a side view of the all-solid-state lithium ion secondary battery 120. The garnet-type oxide prepared in Example 5 was formed into the pellet 110. The pellet 110 had a diameter of 13 mm and a thickness of 2 mm. The positive electrode active material layer 112a was formed in such a manner that $LiCoO_2$ was deposited on a surface of the pellet 110 by a pulse laser deposition (PLD) process. In the PLD process, a Nd—YAG laser ($\lambda$=266 nm, E=~1 $Jcm^{-2}$ $pls^{-1}$) was used and a chamber used to form the positive electrode active material layer 112a was maintained at an oxygen partial pressure $P_{O2}$ of 10 Pa and roam temperature. The positive electrode active material layer 112a had a diameter of 6 mm and a thickness of 500 nm. After the pellet 110 having the positive electrode active material layer 112a was annealed at 500° C. for one hour in an electric furnace with an air atmosphere, an Au paste 112c was applied onto the positive electrode active material layer 112a. An Au metal plate 112b serving as a positive electrode current collector was provided on the Au paste 112c and then baked at 400° C. for 30 minutes. The positive electrode active material layer 112a, the second regional portions 112b, and the Au paste 112c form a positive electrode 112. After the pellet 110 having the positive electrode 112 was provided in a glove box with an Ar atmosphere, a lithium metal serving as a negative electrode 114 was pressed against a surface of the pellet 110 that was spaced from the positive electrode 112, whereby the all-solid-state lithium ion secondary battery 120 was completed. The lithium metal also serves as a reference electrode in addition to the wall deposits 114.

[Charge-Discharge Properties of all-Solid-State Lithium Ion Secondary Battery]

Figure 15:
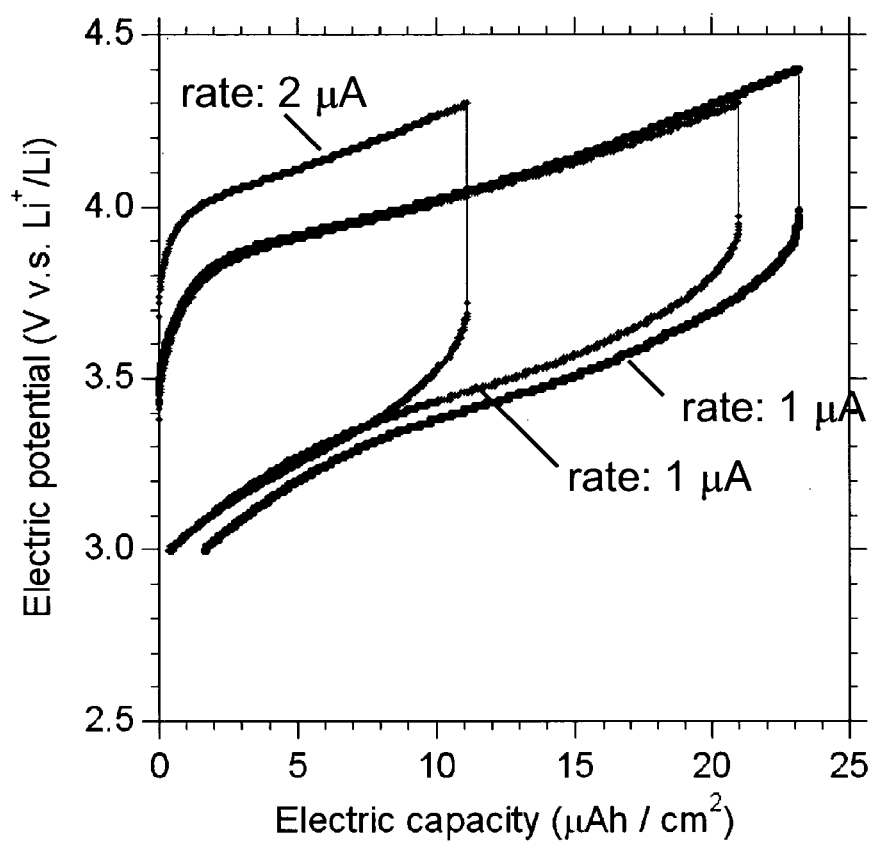
FIG. 15 is a graph showing charge-discharge properties of the all-solid-state lithium ion secondary battery.

The prepared all-solid-state lithium ion secondary battery 120 was subjected to charge-discharge measurement in such a manner that the all-solid-state lithium ion secondary battery 120 was placed in an airtight container in a glove box with an Ar atmosphere and sealed leads were taken out of the airtight container. The all-solid-state lithium ion secondary battery 120 had an open-circuit voltage of 3.0 V. The all-solid-state lithium ion secondary battery 120 was potentiostatically charged and discharged at a sweeping rate of 0.2 mV/min in a scanning range from 3 to 4.3 V for one cycle. The resulting all-solid-state lithium ion secondary battery 120 was charged and discharged at a current of 1 mA in a sweeping potential range from 3 to 4.3 V (versus Li) for three cycles. The resulting all-solid-state lithium ion secondary battery 120 was charged and discharged at a current of 2 mA in a sweeping potential range from 3 to 4.3 V (versus Li) for three cycles. The resulting all-solid-state lithium ion secondary battery 120 was charged and discharged at a current of 1 mA in a sweeping potential range from 3 to 4.4 V (versus Li) for three cycles. That is, the all-solid-state lithium ion secondary battery 120 was potentiostatically charged and discharged for one cycle and then galvanostatically charged and discharged at nine cycles. There was no rest period between the charge-discharge cycles. FIG. 15 shows the measurement results. FIG. 15 is a graph showing charge-discharge properties of the all-solid-state lithium ion secondary battery 120.

Figure 16:
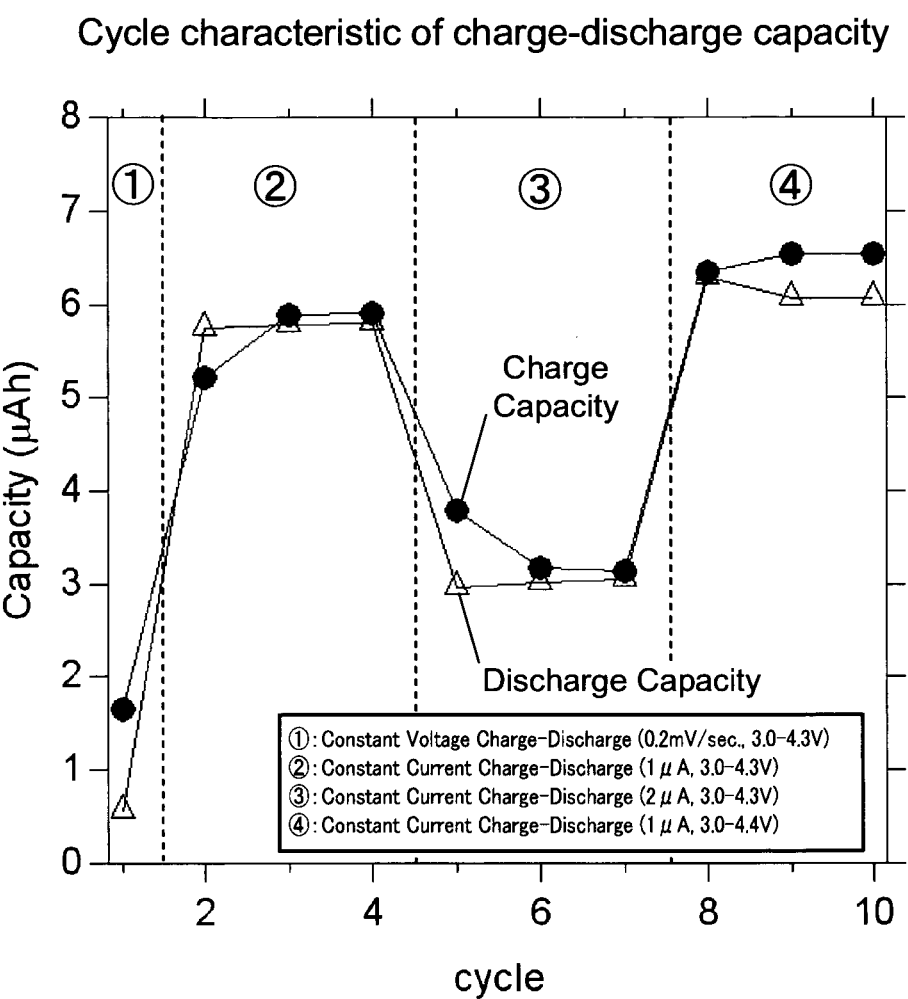
FIG. 16 is a graph showing the capacity of the all-solid-state lithium ion secondary battery at each cycle.

As is clear from FIG. 15, the all-solid-state lithium ion secondary battery 120 demonstrated reversible charge-discharge processes. This confirms that the all-solid-state lithium ion secondary battery 120 operates well. FIG. 16 shows the capacity of the all-solid-state lithium ion secondary battery 120 at each cycle.

Differences between the all-solid-state lithium ion secondary battery 120 and conventional lithium ion secondary batteries are summarized below.

(1) Comparison with Nonaqueous Lithium Ion Secondary Batteries

Electrolytes for use in nonaqueous lithium ion secondary batteries have higher lithium ion conductivity as compared with the garnet-type oxide contained in the all-solid-state lithium ion secondary battery 120. However, the electrolytes have risks such as ignition and deterioration due to decomposition at elevated temperatures (60° C.) and therefore cannot be used at elevated temperatures. Alternatively, some cooling units need to be used to prevent the electrolytes from being heated to high temperatures. In contrast, the garnet-type oxide contained therein is stable at elevated temperatures and is inflammable. The garnet-type oxide contained therein is highly safe and has a merit that no cooling unit is necessary. Most of conventionally reported electrolytes are decomposed at elevated potentials (4.5 V or higher); hence, it is difficult to use positive electrode active materials with high potential together with such electrolytes. In contrast, the garnet-type oxide contained therein is stable at 8 V (see FIG. 12) and therefore can be used together with substantially all of conventionally reported positive electrode active materials.

(2) Comparison with all-Solid-State Lithium Ion Secondary Batteries Containing Sulfide Electrolytes There are substantially no differences in conductivity between the garnet-type oxide contained therein and sulfide electrolytes such as $Li_{3.25}G_{0.25}P_{0.25}S_4$ and therefore there are substantially no differences in electrolyte resistance between the garnet-type oxide contained therein and the sulfide electrolytes. Most of the sulfide electrolytes reportedly have a wide potential window of about 0 to 10 V; hence, there are no significant differences in potential window between the garnet-type oxide contained therein and the sulfide electrolytes. The sulfide electrolytes have a problem in chemical stability because the sulfide electrolytes react with moisture in air to produce gaseous hydrogen sulfide. However, the garnet-type oxide contained therein does not have such a problem.

(3) Comparison with all-Solid-State Lithium Ion Secondary Batteries Containing Other Oxides The garnet-type oxide contained therein has a lithium ion conductivity that is several times greater than that of conventional garnet-type oxides. This allows the garnet-type oxide contained therein to have an electrolyte resistance that is a fraction of that of the conventional garnet-type oxides. Although the Ohara electrolyte (a glass ceramic), which is conventionally known, has a lithium ion conductivity substantially equal to that of the garnet-type oxide contained therein, the Ohara electrolyte is reduced at about 1.5 V to cause a reduction in insulation. Therefore, it is difficult to manufacture high-voltage batteries using the Ohara electrolyte (for example, a carbon-based negative electrode active material that is a major material for current batteries cannot be used). In contrast, the garnet-type oxide contained therein is not reduced even at 8 V but is stable (see FIG. 12). Therefore, the garnet-type oxide contained therein can be used to manufacture high-voltage batteries.

The present application claims priority from the Japanese Patent Application No. 2009-023623 filed on Feb. 4, 2009, and the Japanese Patent Application No. 2009-122991 filed on May 21, 2009, the entire contents of both of which are incorporated herein by reference.

Industrial Applicability

A garnet-type lithium ion-conducting oxide according to the present invention is applicable for all-solid-state lithium ion secondary batteries. An all-solid-state lithium ion secondary battery according to the present invention is applicable for power supplies for industrial equipment and power supplies for have appliances.

The invention claimed is:

1. A garnet-type lithium ion-conducting oxide that is represented by the formula $Li_{5+X}La_3(Zr_X, A_{2-X})O_{12}$,
wherein A is Nb or Ta, and X satisfies the inequality $1.4 \leq X < 2$.

2. The garnet-type lithium ion-conducting oxide according to claim 1, wherein X satisfies the inequality $1.6 \leq X \leq 1.95$.

3. The garnet-type lithium ion-conducting oxide according to claim 1, wherein X satisfies the inequality $1.65 \leq X \leq 1.9$.

4. An all-solid-state lithium ion secondary battery in which a solid electrolyte layer is sandwiched between a positive electrode containing a positive electrode active material capable of occluding and releasing lithium ions and a negative electrode containing a negative electrode active material capable of releasing and occluding lithium ions,
 wherein the solid electrolyte layer is composed of a garnet-type lithium ion-conducting oxide according to claim 1.

\* \* \* \* \*